United States Patent

Marbach

[11] Patent Number: 5,934,647
[45] Date of Patent: Aug. 10, 1999

[54] METAL SEAL FOR VALVE

[75] Inventor: Johannes Marbach, Dorsten, Germany

[73] Assignee: Adams GmbH & Co. Armaturen KG, Herne, Germany

[21] Appl. No.: 08/735,481

[22] Filed: Oct. 23, 1996

[51] Int. Cl.$^6$ ................................................. F16K 1/22
[52] U.S. Cl. ................................. 251/306; 251/305
[58] Field of Search ..................................... 251/306, 305

[56] References Cited

U.S. PATENT DOCUMENTS

| | | | |
|---|---|---|---|
| 4,162,782 | 7/1979 | Wilkins | 251/306 X |
| 4,175,578 | 11/1979 | Priese | 251/306 X |
| 4,231,546 | 11/1980 | Eggleston et al. | 251/306 |
| 4,410,163 | 10/1983 | Scobie et al. | 251/306 |
| 5,377,954 | 1/1995 | Adams et al. | 251/306 |

*Primary Examiner*—John Fox
*Attorney, Agent, or Firm*—Townsend and Townsend and Crew LLP

[57] ABSTRACT

A metal seal for valves, especially disk valves, for use in pipelines through which fluid media flow. The seal ring has at least one, relatively flexible metal or metal composite seal ring which can be mounted to either the housing or the disk of the valve. The seal ring has a flat attachment section from which a curved, in cross-section generally U-shaped, sealing lip extends which, in the closed position of the valve, engages a metallic seating surface of the latter. The seal ring is attached to the valve without separate mounting elements, such as screws or bolts, by welding a free, radial end of the seal ring to a relatively rigid support ring secured to either the housing or the disk of the valve by shrinking engagement. The shrink engagement is a frictional engagement between the support ring and the valve attained by providing the seal ring with a cylindrical shrink surface which has a diameter slightly larger than the diameter of a cooperating cylindrical mounting surface of the valve when the two have the same temperature. Just prior to the installation of the seal ring, its temperature is lowered sufficiently so that the outer diameter of the shrink surface becomes less than the inner diameter of the mounting surface of the valve. In this condition the seal ring is axially inserted into the valve and, thereafter, its temperature is permitted to rise to that of the valve. This increases the diameter of the engagement surface. Expansion is restrained by the surrounding cylindrical mounting surface of the valve. As a result, frictional forces are generated between them which retain the seal ring in its operative position.

5 Claims, 5 Drawing Sheets

1

METAL SEAL FOR VALVE

BACKGROUND OF THE INVENTION

This invention relates to metal seals for pipeline valves which have at least one ring-shaped, metal seal ring secured to either the housing or the movable member of the valve, such as a rotatable ball or a pivotable disk. The seal ring has a radially oriented, flat ring section from which a sealing lip extends which seals against a metal seating surface of the valve.

There are a variety of known metal seal ring configurations for establishing a seal in one or both flow directions through a valve, such as a disk valve. To prevent leakage, such seal rings require a high degree of precision in their manufacture and subsequent installation into the spaces provided for them. German patent publication DE-OS 4,343,562 shows a laminar metal seal made of two seal rings. They are supported in either flow direction through the valve by the prevailing pressure and are replaceably mounted in the valve housing. This sealing arrangement works as expected but has the disadvantage that it requires a relatively large number of different parts which must be separately manufactured, a time consuming and costly task. The present invention eliminates this disadvantage.

SUMMARY OF THE INVENTION

It is an object of the present invention to provide a seal, in a preferred embodiment a metal seal for valves which is constructed of a minimum number of parts, which is relatively inexpensive to produce, and which is simple to assemble. Ideally the seal is such that it can be used for establishing a seal in one or both flow directions through the valve.

The seal ring of the present invention has a rigid support ring to which a circular edge of a laminar seal ring, or seal ring lamella, is welded. The seal ring can be made of metal, such as stainless steel, or of combinations or composites of several materials such as, for example, stainless steel and graphite. The term "laminar seal ring", or lamella, includes seal rings made out of one or more relatively thin sheet metal or composite plates, sheets or foils. The support ring is temperature shrunk onto either the valve housing or its closure member in a seal-tight manner to prevent leakage past it.

Preferred embodiments of the present invention are directed to specific aspects of the manner in which the seal is mounted and constructed.

In one preferred embodiment, the seal ring has a sealing lip which is located radially inwardly of the support ring. A radially outer surface of the support ring fits into a cylindrical inner surface of the housing and abuts a radially oriented ring shoulder thereof.

Another aspect of the present invention contemplates to position the seal ring on and secure it to the support ring so that a surface of the seal ring contacts the radially oriented ring shoulder of the housing.

It is further advantageous to shape the radially inwardly facing surface of the support ring so that it conically expands in the axial flow direction from the side of the support ring to which the seal ring is attached.

The sealing lip of the seal ring of the present invention can have a variety of different shapes. It is advantageous, however, to shape the sealing lip, as is generally known, so that it has a U-shaped cross-section. The free end of the curved sealing lip is oriented so that it faces against the fluid direction flow. This enhances the seal ring support provided by the pressure differential and improves the seal.

A major advantage attained with the present invention is that a sealing assembly or unit is simple and comprises few parts. A unit can be made from a rigid support ring and only one (and sometimes more than one, e.g. two) ring lamella, which are welded and form a single unit ready for installation. The installation of the sealing unit requires no attachment elements, such as screws, bolts or the like, and in that no separate static seal must be formed. The unit is relatively simply and inexpensively installed in accordance with any one of a variety of known shrinking techniques. The shrink connection itself forms a simple, yet tight and effective seal between the support ring and the valve housing (or disk, if the unit is installed on the disk of the valve).

DESCRIPTION OF THE PREFERRED EMBODIMENTS

Figure 1:
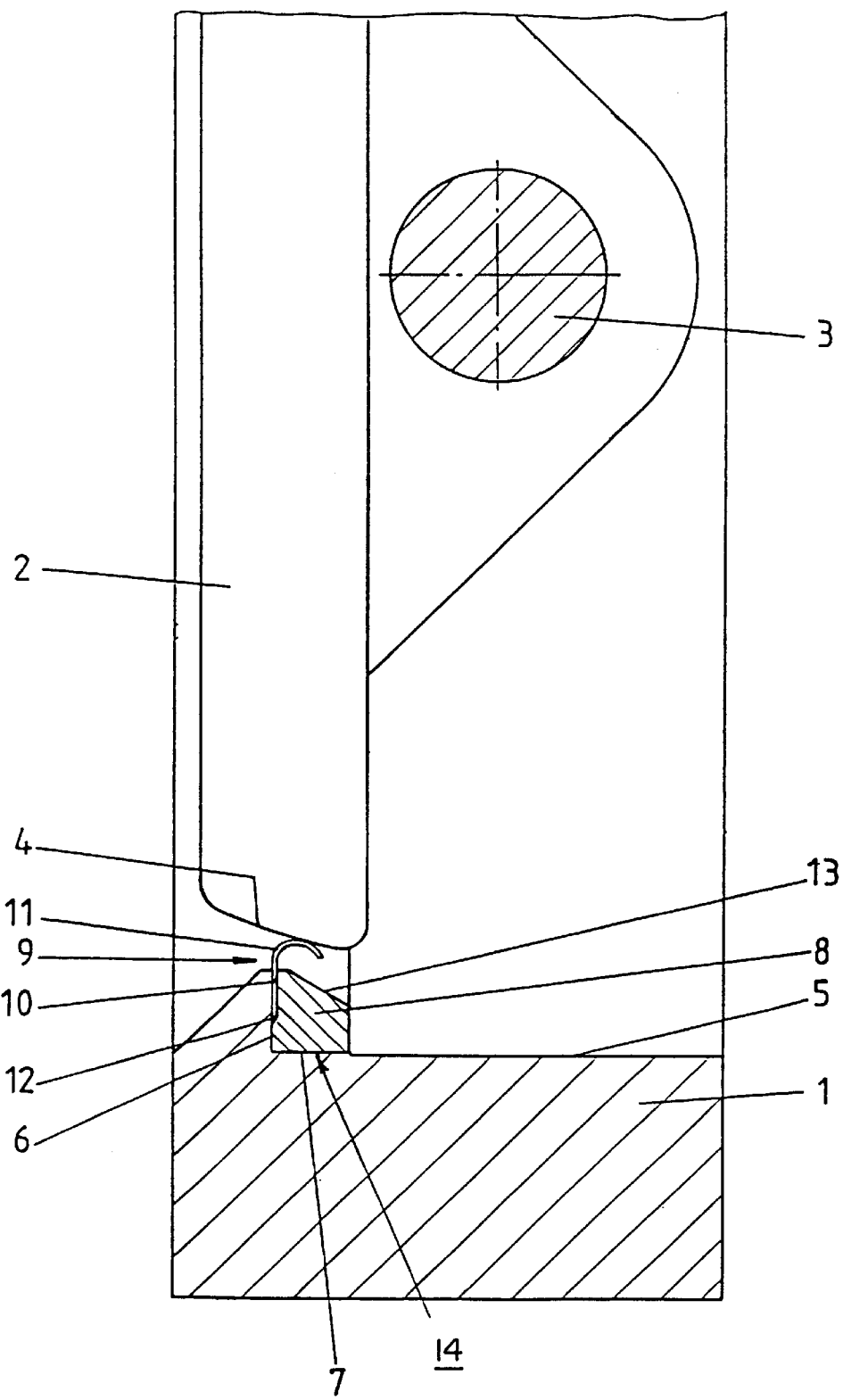
FIG. 1 schematically illustrates a presently preferred example of the invention and partially shows an axial section through a disk valve on which the seal ring lamella is installed on the housing of the valve.

FIG. 1 shows a disk valve which has a housing 1 and a valve disk, shown in its valve closed position, rotatably mounted therein. A disk 2 is nonrotatably secured to a shaft 3 which has ends that are rotatably mounted in housing 1.

The rigid sealing surface 4 of valve disk 2 is conically shaped. The disk 2 is shown in its closed position after it had been pivoted (with shaft 3) in a clockwise direction.

A cylindrical inner wall 5 of housing 1 radially inwardly projecting ends in an annular shoulder 6 located in the vicinity of the seal. A portion of inner wall 5 defines a cylindrical mounting surface 7 of a diameter which is smaller than the remainder of the inner wall.

A complete sealing assembly or unit is made from a rigid support ring 8 and an annular seal ring lamella 9 made of a relatively thin-walled metal and secured by welding to the face of the fixed support ring 8 which abuts shoulder 6. The seal ring has a radially oriented, flat attachment section 10 and a generally U-shaped sealing lip 11 which curves from the attachment section. The sealing lip is resilient relative to the attachment section 10 when the latter is secured to the support ring. When the valve disk is in its closed position, the lip engages the rigid seating surface 4 in a resiliently prestressed manner. The pressure exerted by the fluid medium on the upstream side of the closed valve enhances the force with which the sealing lip is pressed against the seating surface of the disk.

The attachment section 10 of the sealing ring lies flat against the rigid support ring 8 and a continuous weld 12 secures it to the support ring 8 in a fluid-tight manner. To effect a continuous, flat contact surface, the inner face of the support ring includes an annular recess the axial extent of which corresponds to the thickness of attachment section 10 of the seal ring. The radially inwardly facing side of support ring 8 defines a partially or completely conically-shaped surface 13 which diverges in a direction away from annular shoulder 6 (i.e. to the right as seen in FIG. 1).

The support ring is mounted to valve housing 1 by means of a shrinking process. To effect this, support ring 8 is dimensioned so that, prior to its installation in the housing, the diameter of its outer, cylindrical shrink surface 14 is slightly larger than the inner diameter of cylindrical mounting surface 7 of the housing 1. Just prior to its installation, the support ring 8 is sufficiently cooled to shrink the shrink surface diameter to less than that of mounting surface 7. The ring can now be axially slid along the mounting surface until it abuts annular shoulder 6 of the housing. As the temperature of the support ring returns to its preinstallation temperature, the ring attempts to expand to the preinstallation diameter, which is limited by the cylindrical mounting surface 7. As a result, the support ring becomes prestressed, and shrink surface 14 tightly engages the mounting surface 7 of the housing and becomes sealed thereto so that fluid under pressure cannot leak past it when the valve disk is closed. When the temperature of the valve changes, e.g. increases, the prestress forces in the support ring also increase. This in turn increases the force with which the support ring engages the cylindrical mounting surface 7 of the housing.

A particular advantage of the new sealing arrangement of the present invention is the fact that it can be installed without mounting elements that can become loose in use. The danger of down-time of and/or damage to the valve as a result of loose seal ring mounting elements is thereby reduced.

Figure 2:
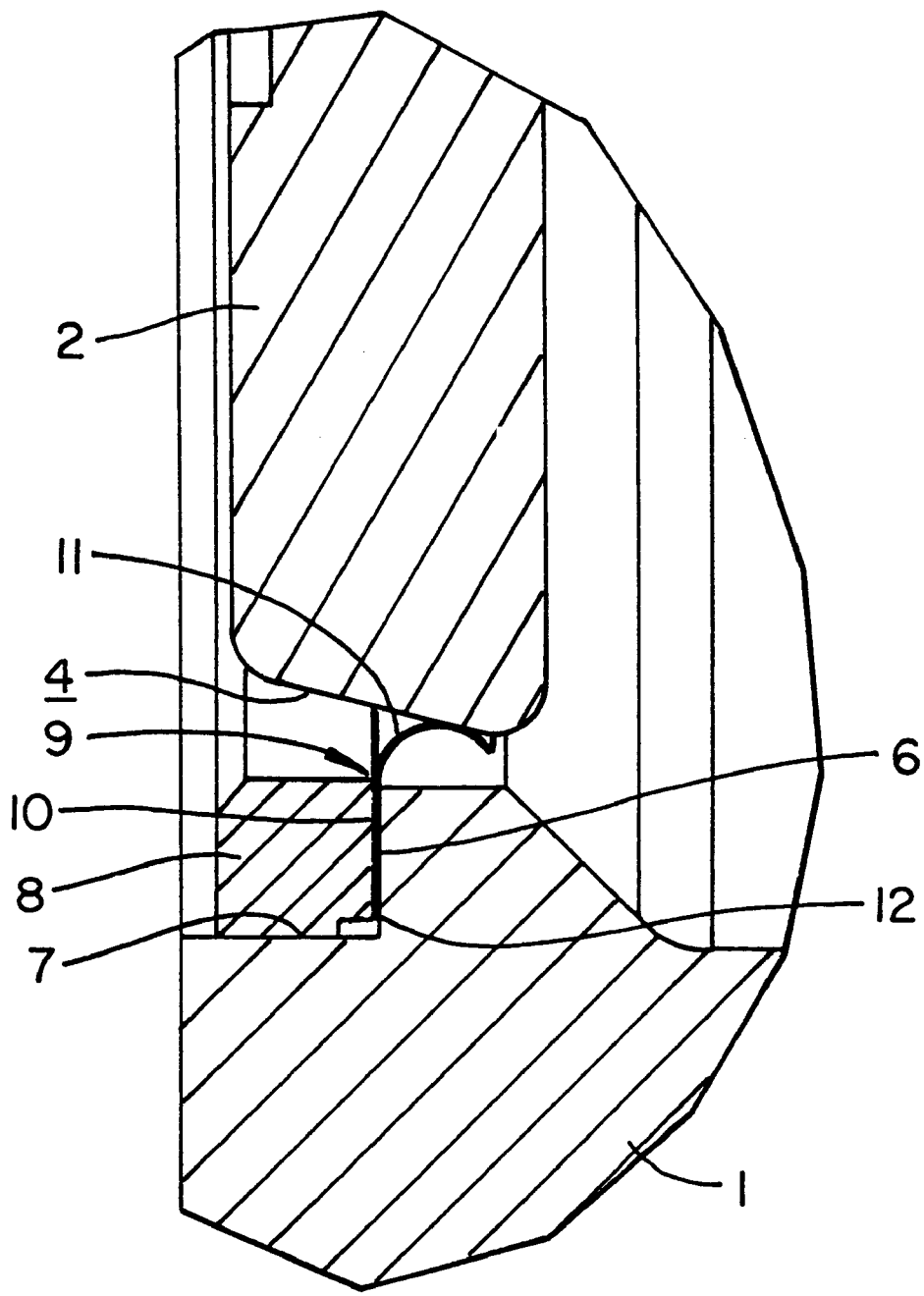
FIG. 2 is a fragmentary, side elevational view, in section, which illustrates the installation of a modified seal ring constructed in accordance with the present invention.

Referring briefly to FIG. 2, as an alternative to the seal ring installation shown in FIG. 1, the cylindrical mounting surface 7 opens in the opposite direction from what is shown in FIG. 1 and seal ring 9 is secured to the mounting ring so that its sealing lip 11 curves towards the opposite direction from that shown in FIG. 1; that is, so that it curves to the right instead of to the left.

Figure 3:
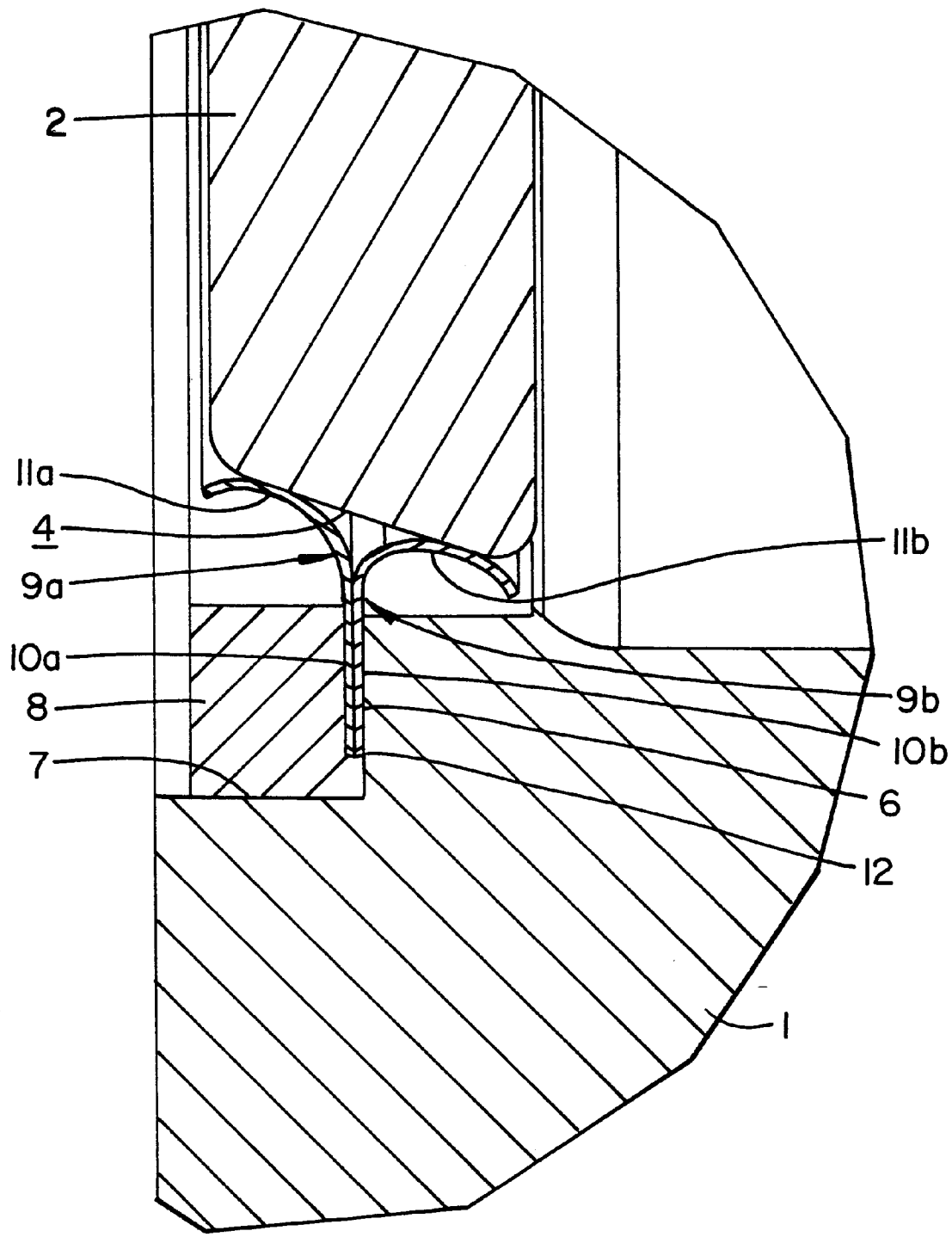
FIG. 3 is a fragmentary, side elevational view which illustrates the installation of a seal ring constructed in accordance with a further embodiment of the present invention.

Referring to FIG. 3, in another embodiment of the present invention, support ring 8 is installed as illustrated in FIG. 2; that is, from the left rather than from the right (as shown in FIG. 1). Contrary to the embodiment of the invention shown in FIG. 2, the embodiment of FIG. 3 comprises a plurality of, e.g. two, seal rings 9a, 9b which have respective radially oriented, flat attachment sections 10a, 10b and generally U-shaped sealing lips 11a, 11b which curve in opposite directions. Concave surfaces of the sealing lips engage and seal against the rigid sealing surface 4 of valve disk 2.

An advantage of the seal ring shown in FIG. 3 is that is behaves substantially identically irrespective of which side of the closed valve disk 2 is pressurized.

Figure 4:
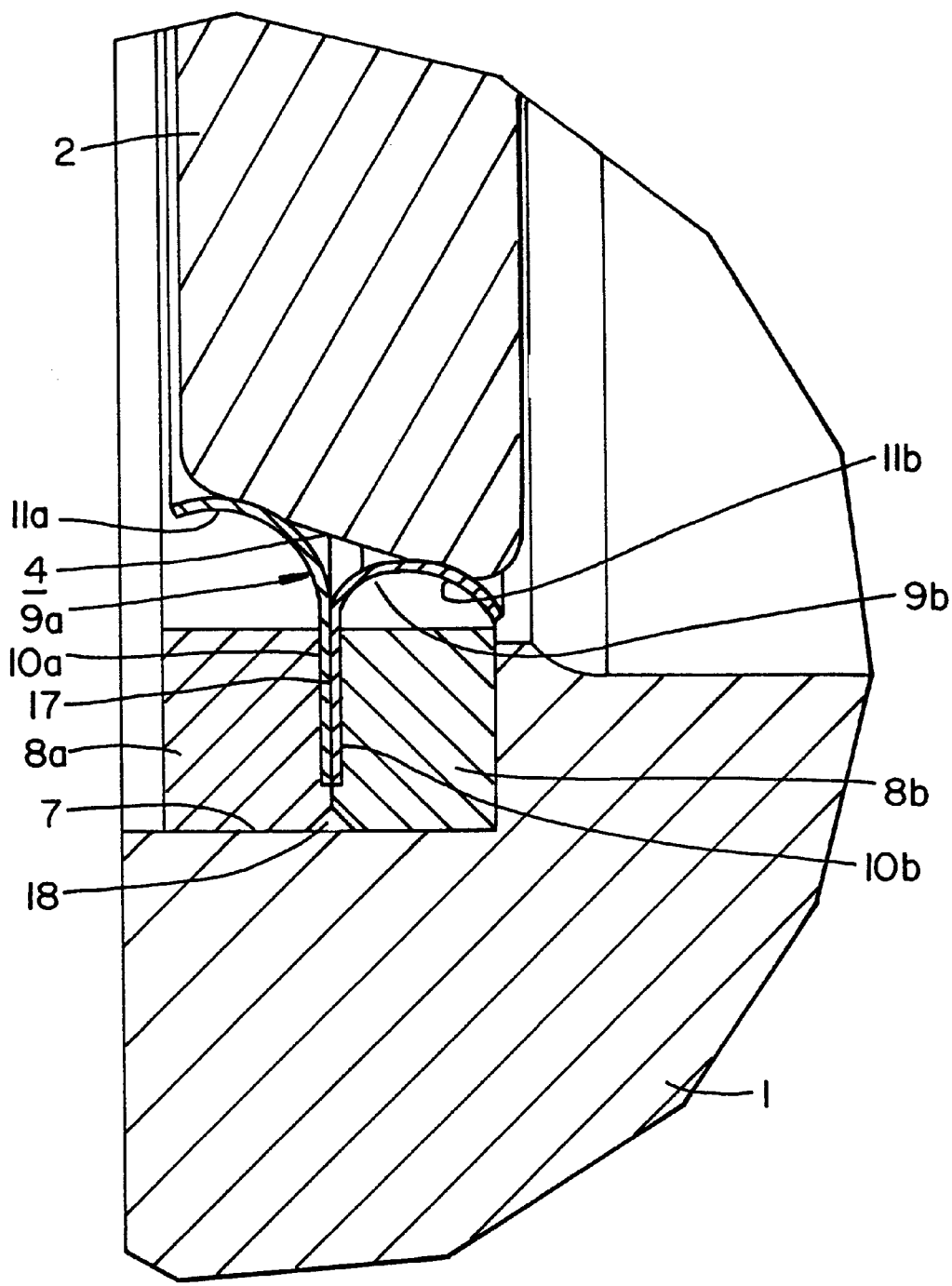
FIG. 4 is a fragmentary, side elevational view, similar to FIG. 3, which illustrates a seal ring constructed as illustrated in FIG. 3 but installed with two support rings.

Referring to FIG. 4, in yet another embodiment of the present invention the seal ring is defined by first and second seal rings 9a, 9b which have sealing lips 11a, 11b that curve in opposite directions and engage the rigid sealing surface 4 of disk 2. The support ring, which mounts sealing rings 9a, 9b, is made of first and second, axially aligned support rings 8a, 8b, the opposing surfaces of which define a narrow, elongated, radially outwardly open slot 17 in which the flat attachment sections 10a, 10b of the seal ring are received. The radially inwardly facing edges of the flat attachment sections are welded together, to prevent leakage between the two sections, and the seal ring may be welded to one or the other of the two support rings 8a, 8b. Alternatively, the support rings may be welded together as is schematically illustrated at 18 in FIG. 4.

Figure 5:
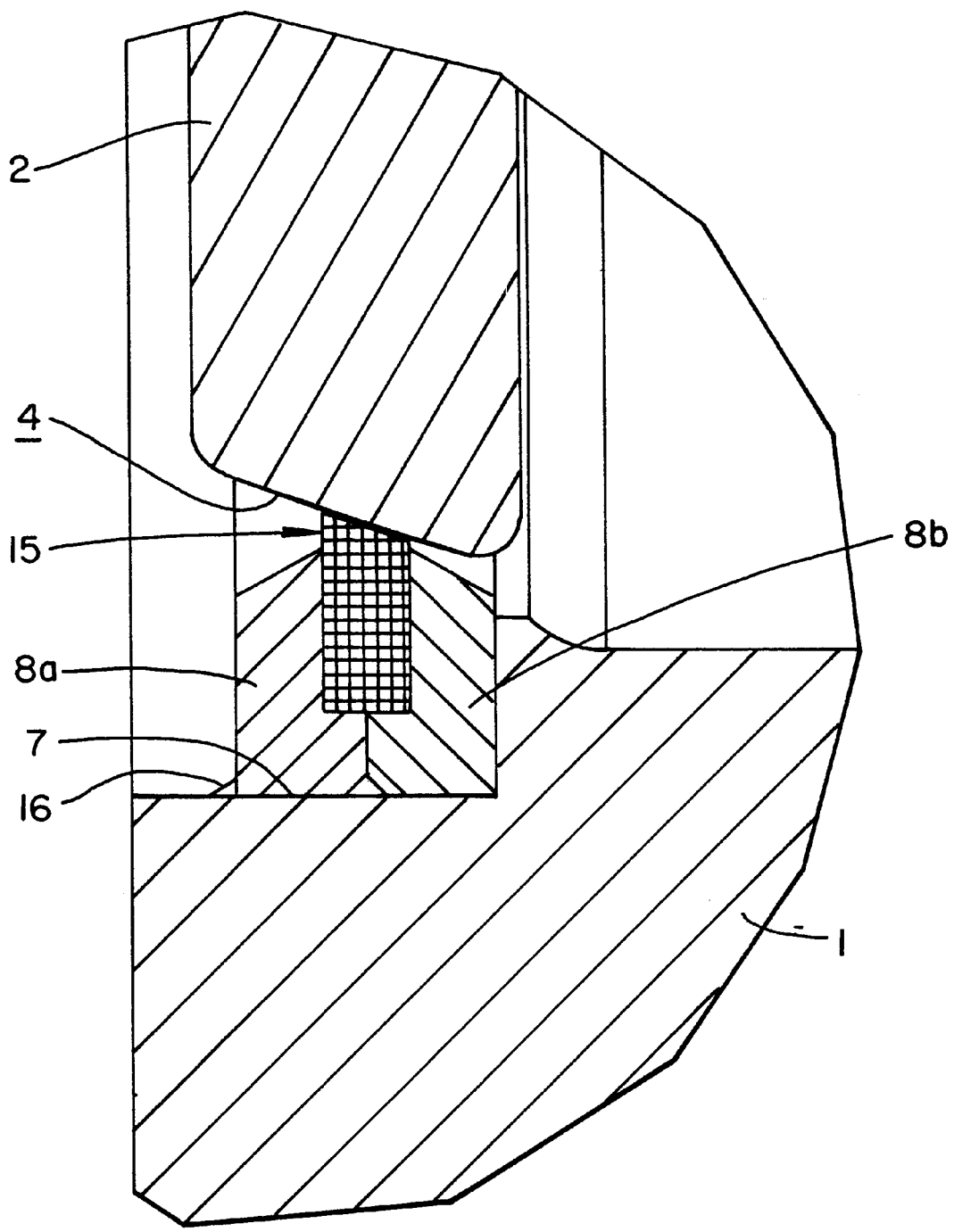
FIG. 5 is a fragmentary, side elevational view, in section, and illustrates a further embodiment of the present invention.

Referring to FIG. 5, a seal ring 15 constructed, for example, of alternating stainless steel and graphite disks is clamped between support rings 8a, 8b by providing the opposing surfaces of the support ring with appropriate radially outwardly open cutouts. Leakage past the seal ring is prevented by tightly clamping the support rings 8a, 8b to each other, welding them to each other, or applying a sealing bead 16 about its periphery as illustrated in FIG. 5.

What is claimed is:

1. A valve comprising a housing with a through bore through which a fluid medium flows; a valve closure member disposed in the through bore and mounted to the housing for movement between an open position in which the fluid medium can flow through the through bore and a closed position in which flow of the fluid medium through the through bore is prevented; a valve seal seating surface defined by one of the housing and the valve closure member; another one of the housing and the valve closure member defining a cylindrical mounting surface of a given diameter for receiving the seal ring assembly and an end wall which extends radially from an end of the cylindrical mounting surface; a seal ring assembly comprising a support ring immovably secured to the cylindrical mounting surface and having an end face proximate the end wall; and a seal ring having a flat attachment section placed against the end face of the support ring and a sealing lip extending from and contiguous with the flat attachment section, the sealing lip having a cross-section defining a generally convex outer sealing surface engaging the valve seal seating surface when the valve closure member is in its closed position; the end face of the support ring including an annular recess extending from one radial end of the end face towards another radial end of the support ring and having a depth substantially equal to a thickness of the flat attachment section of the seal ring, and including a continuous annular weld securing the seal ring to the support ring and establishing a fluid seal between them.

2. A valve according to claim 1 wherein the continuous weld is formed along a free edge of the attachment section.

3. A valve according to claim 2 wherein the annular recess terminates intermediate the radial ends of the support ring, and wherein the continuous annular weld is located in a vicinity of where the annular recess ends.

4. A valve comprising a housing with a through bore through which a fluid medium flows; a valve closure member disposed in the through bore and mounted to the housing for movement between an open position in which the fluid medium can flow through the through bore and a closed position in which flow of the fluid medium through the through bore is prevented; a valve seal seating surface defined by one of the housing and the valve closure member; another one of the housing and the valve closure member defining a cylindrical mounting surface of a given diameter for receiving the seal ring assembly and an end wall which extends radially from an end of the cylindrical mounting surface; a seal ring assembly comprising a support ring immovably secured to the cylindrical mounting surface and having an end face proximate the end wall; a seal ring having a flat attachment section placed against the end face of the support ring and ending in an annular edge, and a sealing lip extending from and contiguous with the flat attachment section, the sealing lip having a cross-section defining a generally convex outer sealing surface engaging the valve seal seating surface when the valve closure member is in its closed position; and a continuous weld along the annular edge of the seal ring securing the seal ring to the support ring and forming a fluid-tight seal between them.

5. A valve comprising a housing with a through bore through which a fluid medium flows; a valve closure member disposed in the through bore and mounted to the housing for movement between an open position in which the fluid medium can flow through the through bore and a closed position in which flow of the fluid medium through the through bore is prevented; a valve seal seating surface defined by one of the housing and the valve closure member; another one of the housing and the valve closure member defining a cylindrical mounting surface of a giver diameter for receiving the seal ring assembly and an end wall which extends radially from an end of the cylindrical mounting surface; a seal ring assembly comprising a support ring immovably secured to the cylindrical mounting surface and having an end face proximate the end wall; a seal ring having a flat attachment section placed against the end face of the support ring and a sealing lip extending from and contiguous with the flat attachment section, the sealing lip having a cross-section defining a generally convex outer sealing surface engaging the valve seal seating surface when the valve closure member is in its closed position; a weld securing the seal ring to the support ring; and means forming a seal between the seal ring and the support ring preventing passage of the fluid medium between the seal ring and the support ring.

* * * * *